US 6,613,428 B2

(12) United States Patent
Yamanaka et al.

(10) Patent No.: US 6,613,428 B2
(45) Date of Patent: *Sep. 2, 2003

(54) MAGNETIC RECORDING MEDIUM AND MAGNETIC RECORDING AND REPRODUCING APPARATUS WHEREIN THE MAGNETIC LAYER HAS A FLUCTUATION OF FIELD; A OR $H_F$ OF NOT LESS THAN 30 OERSTEDS

(75) Inventors: Kazusuke Yamanaka, Kanagawa (JP); Tomoo Yamamoto, Hchiohji (JP); Yuzuru Hosoe, Hino (JP); Nobuyuki Inaba, Hasuda (JP); Yasutaro Uesaka, Kokubunji (JP); Masaaki Futamoto, Kanagawa (JP); Yoshibumi Matsuda, Odawara (JP); Kenji Furusawa, Yokohama (JP); Shinji Narishige, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/849,404

(22) Filed: May 7, 2001

(65) Prior Publication Data

US 2001/0021465 A1 Sep. 13, 2001

Related U.S. Application Data

(63) Continuation of application No. 08/521,363, filed on Aug. 31, 1995, now Pat. No. 6,310,748.

(30) Foreign Application Priority Data

Sep. 8, 1994 (JP) .............................. 6-214714

(51) Int. Cl.[7] .................................. G11B 5/64
(52) U.S. Cl. ..................... 428/336; 428/409; 428/694 T
(58) Field of Search .......................... 428/611, 694 T, 428/900, 336, 409

(56) References Cited

U.S. PATENT DOCUMENTS

| 4,824,724 A | * | 4/1989 | Ueda et al. .............. 204/192.2 |
| 5,478,661 A | | 12/1995 | Murayama et al. |
| 5,480,733 A | | 1/1996 | Okumura et al. |
| 5,482,785 A | | 1/1996 | Mahvan et al. |
| 5,492,720 A | | 2/1996 | Gill et al. |
| 5,510,181 A | | 4/1996 | Nabata |
| 5,587,235 A | | 12/1996 | Suzuki et al. |
| 5,686,177 A | | 11/1997 | Yamanaka et al. |
| 6,310,748 B1 | * | 10/2001 | Yamanaka et al. .......... 360/135 |

FOREIGN PATENT DOCUMENTS

| JP | 4-295615 | 10/1992 |
| JP | 6-243455 | 9/1994 |
| JP | 7-65345 | 3/1995 |

OTHER PUBLICATIONS

Index of Jour. of Mag. and Mag. Materials, vol. 145 (printed web document).*

(List continued on next page.)

Primary Examiner—Paul Thibodeau
Assistant Examiner—Kevin M. Bernatz
(74) Attorney, Agent, or Firm—Antonelli, Terry, Stout & Kraus, LLP

(57) ABSTRACT

A thin film magnetic recording medium including a magnetic layer having a fluctuation field defined as $S/X_{irr}$, where S is magnetic viscosity and $X_{irr}$ is irreversible susceptibility $X_{irr}$. The fluctuation field of the magnetic layer is not less than 15 oersteds.

2 Claims, 3 Drawing Sheets

OTHER PUBLICATIONS

El–Hilo, M., O'Grady, K., and Chantrell, R., IEEE Trans. Mag., 27(6), 1991, 5061–5063.*

Thomson, T., O'Grady, K, and Chantrell, R., IEEE Trans. Mag., 28(5), 1992, 2518–2520.*

K. Yamanaka et al., "Fluctuation fields and medium noise in CoCrTa and CoCrPt films", *Journal of Magnetism and Magnetic Materials*, vol. 152 (1996), pp. 411–416.

E. Wohlfarth, "The coefficient of magnetic viscosity", *Journal of Physics F: Metal Physics*, vol. 14, 1984, pp. L155–L159.

K. Yamanaka et al., "Magnetic viscosity of oriented barium ferrite media", *Journal of Magnetism and Magnetic Materials*, vol. 127, 1993, pp. 233–240.

K. Yamanaka et al., "Time dependence of remanence coercivity and medium noise in obliquely evaporated Co films", *Journal of Magnetism and Magnetic Materials*, vol. 145, 1995, pp. 255–260.

* cited by examiner

MAGNETIC RECORDING MEDIUM AND MAGNETIC RECORDING AND REPRODUCING APPARATUS WHEREIN THE MAGNETIC LAYER HAS A FLUCTUATION OF FIELD; A OR $H_F$ OF NOT LESS THAN 30 OERSTEDS

CROSS-REFERENCE TO RELATED APPLICATION

This application is a continuation of application Ser. No. 08/521,363 filed on Aug. 31, 1995, now U.S. Pat. No. 6,310,748, the contents of which are hereby incorporated herein by reference in their entirety.

BACKGROUND OF THE INVENTION

The present invention relates to a magnetic recording medium using a ferromagnetic metal thin film, and more particularly, to a magnetic recording medium having excellent electromagnetic transducing properties, and a large capacity magnetic recording and reproducing apparatus.

For improving the recording density, increasing the output, and reducing the noise of magnetic recording media, it is essential to micronize magnetic particles in the case of a coated medium and crystal grains in the case of a thin film medium. Regarding a medium using metal particles that has heretofore been studied, for example, micronization has progressed and high-performance tapes such as Hi-8 (8-mm high-density magnetic tapes) using extra-fine particles having a cylinder major axis length of approximately 200 nm and a cylinder diameter of approximately 30 nm are now put to practical use. Incidentally, a plurality of particles are subjected to magnetic reversal in a group and signals are recorded when magnetic particles have been formed into a cluster agglomerate or when the interaction between crystal grains is strong even though the magnetic particles or crystal grains of a magnetic medium are extremely fine. When the plurality of particles are subjected to magnetic reversal and when the magnetic reversal unit becomes larger, noise increases at the time of reproducing data. In consequence, the density improvement is greatly hampered.

The size of the magnetic reversal unit is relevant to magnetic viscosity. In other words, it is considered that the greater the fluctuation field of magnetic viscosity becomes, the smaller the magnetic reversal unit is. A description has been given of a meaning of the fluctuation field of magnetic viscosity in *Journal of Physics F: Metal Physics*, Vol. 14, 1984, pp. L155–L159. Further, a detailed description has also been given of the measurement conditions in *Journal of Magnetism and Magnetic Materials*, Vol. 127, 1993, pp, 233–240. The principle of measuring the fluctuation field of magnetic viscosity will subsequently be described.

When a new magnetic field is applied to a magnetic material, the magnetization I(t) often varies in relation to the logarithm ln(t) of the field applied time:

$$I(t) = \text{const} + S \cdot \ln(t) \quad (1)$$

In this case, I(t) represents a magnetic moment per unit volume, and t represents elapsed time after the new magnetic field is applied. The viscosity coefficient S has a positive value when the magnetic field is shifted in the positive direction and has a negative value when the magnetic field is shifted in the negative direction. Moreover, it is known that S can be expressed by the product of the irreversible susceptibility $X_{irr}$ and the fluctuation field $H_f$. In other words, there is established the following relation:

$$S = X_{irr} \cdot H_f \quad (2)$$

Therefore, the fluctuation field is determined if S and $X_{irr}$ are found experimentally. The fluctuation field is a quantity representing the degree of the influence of thermal fluctuation, and a greater fluctuation field signifies that it is easily affected by thermal fluctuation and that the magnetic reversal unit is small in size.

The fluctuation field where the field strength is equal to coercivity or remanence coercivity can also be found from the dependence on the field applied time of the coercivity $H_c$ or remanence coercivity $H_r$. The coercivity or remanence coercivity, together with field applied time t, often decreases according to the following relation $$H_c(\text{or } H_r) = -A \cdot \ln(t) + \text{const} \quad (3)$$

as the application time elapses. All the specimens mentioned in the present specification satisfied Eq. (3). When the coercivity or remanence coercivity varies with the field applied time t according to Eq. (3), it is known that A takes substantially the same value as that of the fluctuation field $H_f$ where the field strength is equal to the coercivity or remanence coercivity. This procedure is not only simple but also excellent in reproducibility. Hence, the value A is taken as the fluctuation field of magnetic viscosity according to the present invention.

By measurement at room temperature, the fluctuation field thus found has the nature of becoming large in proportion to the absolute temperature at the time of measurement. When a fluctuation field is measured at room temperatures ranging from 10° C. to 30° C. excluding 25° C. according to the present invention, the fluctuation field thus measured is multiplied by (298/T) (where T is the absolute temperature), and the product is taken as a fluctuation field $H_f$ at 25° C.

In accordance with the conventional method, a Cr underlayer was first formed on a mirror-polished disk made of Ni—P electroless-plated Al—Mg alloy, and then a CoCrTa magnetic layer together with a protective carbon film was formed thereon to fabricate a magnetic disk. The Cr underlayer, the magnetic layer, and the protective layer were formed by Ar-gas sputtering. In this case, the substrate temperature and the Ar pressure were 300° C. and 2.0 millitorr, respectively. Further, the Cr under-layer, the magnetic layer, and the protective layer were 50 nm, 25 nm, and 10 nm thick, respectively. The composition of the CoCrTa magnetic layer is Co: 80%, Cr: 16%; Ta: 4%, expressed by atomic %. This composition will be expressed as $CoCr_{16}Ta_4$. The coercivity $H_c$ and the remanence coercivity $H_r$ were 1645 and 1655 oersteds, respectively. Further, the fluctuation fields of magnetic viscosity at 25° C. at the field strength equal to the coercivity and at the field strength equal to the remanence coercivity were 13.5 and 13.2 oersteds, respectively. Thus, the fluctuation fields of magnetic viscosity at 25° C. at the field strength equal to the coercivity and at the field strength equal to the remanence coercivity exhibit substantially the same value; hereinafter these are called simply the fluctuation field in this specification.

Incidentally, the measuring time of the fluctuation field ranged from 0 to 30 minutes.

A permalloy head having a gap length of 0.4 μm and a coil of 24 turns was used to record magnetic data on the medium, and a magneto-resistive permalloy head was used to reproduce the data in order to examine the electromagnetic transducing properties. The flying height at the time of recording and reproducing data was 80 nm. As a result of measurement, noise at a longitudinal bit density of 150 kFCI (kilo Flux Change per Inch) was 22 $\mu$Vrms.

Although a magnetic disk unit having a recording density of 300 megabits/square inch could be fabricated by using this medium, a magnetic disk unit having a recording density of 1-gigabit/square inch could not be fabricated.

An object of the present invention is to provide a magnetic recording medium and a magnetic recording and reproducing apparatus suitable for reducing noise at the time of reproducing data and for high-density recording.

SUMMARY OF THE INVENTION

FIG. 1 is an enlarged sectional view of a magnetic recording medium embodying the present invention. In FIG. 1, reference numeral 1 denotes a nonmagnetic substrate of Ni—P-clad aluminum, Ni—P-clad aluminum-magnesium alloy, glass carbon, or the like; 2, a nonmagnetic under-layer for controlling the crystal orientation and crystal grain size of a magnetic film, which is a metallic layer of Cr, Cr—Mo, Cr—W, Cr—Ti, Cr—V, or the like; 3, a ferromagnetic thin film of a cobalt-based alloy such as Co—Cr—Ta, Co—Cr—Pt, Co—O, Co—Ni, Co—Cr, Co—Mo, Co—Ta, Co—Ni-Cr, Co—Ni—O, or the like; and 4, a protective lubricant layer in which a carbon film, an oxide film, a plasma polymerized film, fatty acid, perfluorocarbon carboxylic acid, perfluoropolyether, or the like may be used as a single or composite material. A ferromagnetic thin film for use as the magnetic layer 3 is desirably such that the fluctuation field of magnetic viscosity at 25° C. at the field strength equal to the remanence coercivity or the coercivity is not less than 15 oersteds, the coercivity is not less than 2000 oersteds, and the thickness of the magnetic layer 3 is not less than 5 nm and not more than 30 nm. It is more desirable that the fluctuation field of magnetic viscosity at 25° C. at the field strength equal to the remanence coercivity or the coercivity is not less than 20 oersteds. The ferromagnetic thin film is desirably a cobalt-based ferromagnetic thin film containing at least one element selected from the group consisting of Cr, Ta, Pt, Ni, Mo, V, Ti, Zr, Hf, Si, W, and O, for example, a thin film containing cobalt of Co—Cr—Ta, Co—Cr—Pt, CO—O, Co—Ni, Co—Cr, Co—Mo, Co—Ta, Co—Ni—Cr, CO-Ni-0, or the like.

A specific method for measuring the fluctuation field is as follows.

In order to obtain a fluctuation field A, a magnetic field of −10,000 oersteds is applied to a specimen 7 mm square cut out of a magnetic disk before being subjected to dc-erase. Subsequently, a positive magnetic field slightly lower than the coercivity or remanence coercivity is applied to the specimen to obtain time t until the magnetization or remanent magnetization decreases to zero. While the positive magnetic field applied after the dc-erase is lowered gradually, the operation above is repeated. The fluctuation field A is found from the dependence of the coercivity or remanence coercivity on the field applied time thus determined according to Eq. (3). The fluctuation field found from the dependence of the coercivity on the field applied time shows substantially the same value as that of the fluctuation field found from the dependence of the remanence coercivity on the field applied time. Because of measurement simplicity, the fluctuation field A was found from the dependence of the remanence coercivity on the field applied time according to the present invention. A vibrating sample magnetometer of DMS (Digital Measurement Systems) Co. was employed for the measurement purposes. The measuring temperature was at 25° C. and the field applied time after the dc-erase was in a range of 0 to 30 minutes.

Data from 8 seconds up to 30 minutes was used when the fluctuation field was found since an error in the applied time tends to become greater in a region of a short time less than several seconds.

Although the magnetic disk was an object in the example above, the present invention is also effective for magnetic recording media such as magnetic tapes.

When a ferromagnetic thin film whose fluctuation field of magnetic viscosity at 25° C. at the field strength equal to the remanence coercivity or the coercivity is not less than 15 oersteds and whose coercivity is not less than 2000 oersteds is used, and a magnetic layer 3 whose thickness is not less than 5 nm and not more than 30 nm is used, it is possible to lower the noise level and to raise the S/N value since the cluster size can be decreased at the time of magnetic reversal.

By the combination with a magnetic head using a metal magnetic film in part of the magnetic pole, the medium capable of fast recording is allowed to demonstrate its performance, so that a large-capacity recording and reproducing apparatus can be provided.

DETAILED DESCRIPTION OF THE INVENTION

Referring to embodiments of the present invention, a detailed description will subsequently be given of the contents thereof.

Embodiment 1

A Cr-alloy under-layer was first formed on a mirror-polished disk made of Ni—P electroless-plated Al—Mg alloy, and then a CoCrTa magnetic layer together with a protective carbon film was formed thereon to fabricate a magnetic disk.

The Cr-alloy under-layer, the magnetic layer, and the protective layer were formed by Ar-gas sputtering. In this case, the Ar pressure was 2.0 millitorr. Cr—V, Cr—W, Cr—Ti, Cr—Si, and Cr—Mo were used for Cr-alloy under-layers to prepare 20 specimens in total different in under-layer composition. The Cr-alloy layer, the magnetic layer, and the protective layer were 50 nm, 25 nm, and 10 nm thick, respectively. The composition of the CoCrTa magnetic layer thus utilized was $CoCr_{16}Ta_4$. The substrate temperature at the time of forming the Cr-alloy under-layer and the protective carbon film was 300° C., whereas the substrate temperature at the time of forming the magnetic layer was 250–300° C.

The coercivities $H_c$ of the media thus prepared were distributed in a range of 1500–2400 oersteds. The fluctuation fields were distributed in a range of 11.3–16.5 oersteds.

A permalloy head having a gap length of 0.4 μm and a coil of 24 turns was used to record magnetic data on the media, and a magneto-resistive permalloy head was used to reproduce the data in order to examine the electromagnetic transducing properties. The flying height at the time of recording and reproducing data was 80 nm. As a result of measurement, the noise values at the longitudinal bit density of 150 kFCI ranged from 18 to 25 μVrms. Table 1 collectively shows the measurement results.

TABLE 1

| Composition of magnetic film | Thickness of magnetic film (nm) | Fluctuation field (Oe) | Coercivity (Oe) | Noise (μVrms) |
|---|---|---|---|---|
| $CoCr_{16}Ta_4$ | 25 | 11.3 | 1500 | 25.0 |
| $CoCr_{16}Ta_4$ | 25 | 11.5 | 1601 | 24.6 |
| $CoCr_{16}Ta_4$ | 25 | 11.8 | 1685 | 24.3 |
| $CoCr_{16}Ta_4$ | 25 | 12.1 | 1723 | 24.5 |
| $CoCr_{16}Ta_4$ | 25 | 12.3 | 1756 | 23.6 |
| $CoCr_{16}Ta_4$ | 25 | 12.6 | 1832 | 23.2 |
| $CoCr_{16}Ta_4$ | 25 | 12.9 | 1889 | 22.6 |
| $CoCr_{16}Ta_4$ | 25 | 13.0 | 1890 | 22.5 |
| $CoCr_{16}Ta_4$ | 25 | 13.1 | 1926 | 22.0 |
| $CoCr_{16}Ta_4$ | 25 | 13.2 | 1956 | 22.1 |
| $CoCr_{16}Ta_4$ | 25 | 13.4 | 1985 | 21.8 |
| $CoCr_{16}Ta_4$ | 25 | 13.6 | 1989 | 21.5 |
| $CoCr_{16}Ta_4$ | 25 | 13.9 | 2023 | 21.3 |
| $CoCr_{16}Ta_4$ | 25 | 14.1 | 2056 | 21.4 |
| $CoCr_{16}Ta_4$ | 25 | 14.3 | 2122 | 20.7 |
| $CoCr_{16}Ta_4$ | 25 | 14.6 | 2146 | 20.2 |
| $CoCr_{16}Ta_4$ | 25 | 14.7 | 2250 | 20.5 |
| $CoCr_{16}Ta_4$ | 25 | 15.0 | 2280 | 19.5 |
| $CoCr_{16}Ta_4$ | 25 | 15.5 | 2420 | 19.0 |
| $CoCr_{16}Ta_4$ | 25 | 16.5 | 2400 | 18.0 |

Figure 1:
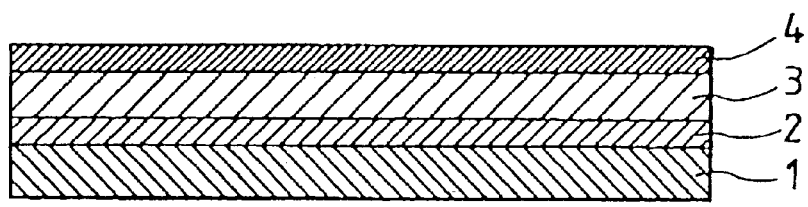
FIG. 1 is a sectional view of a magnetic recording and reproducing medium embodying the present invention.
Figure 2:
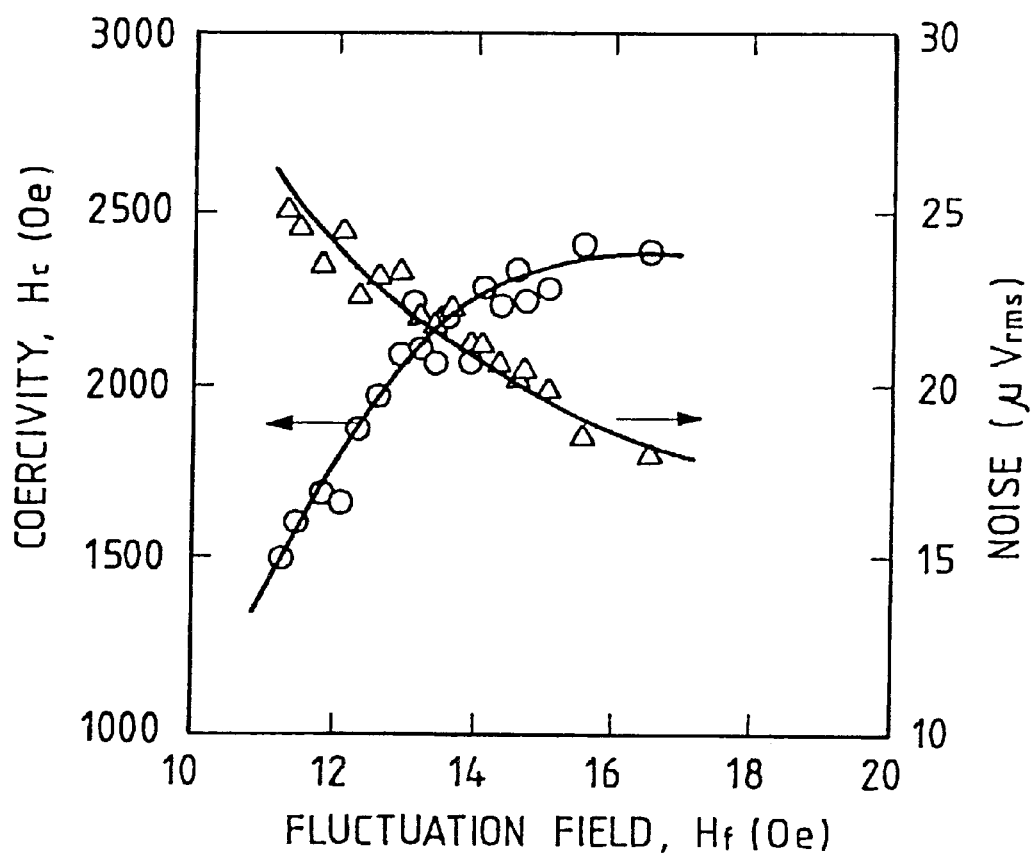
FIG. 2 is a characteristic diagram showing the relations between the fluctuation field and the coercivity and between the fluctuation field and the noise.

FIG. 2 shows the relations between the fluctuation field and the coercivity and between the fluctuation field and the noise. As is obvious from FIG. 2, the noise values of the media whose fluctuation fields have great values are low. The S/N values of the media of having fluctuation fields of not less than 15 oersteds are higher than those of conventional media. It is therefore possible to make the recording density higher than conventional. The use of media with fluctuation fields of not less than 15.0 oersteds made it possible to manufacture magnetic disk units having a recording density of 1-gigabit/square inch.

Embodiment 2

As in the first embodiment of the present invention, a Cr under-layer was first formed on a mirror-polished disk made of a Ni—P electroless-plated Al—Mg alloy, and then a CoCrPt magnetic layer together with a protective carbon film was formed thereon to prepare a magnetic disk.

The Cr under-layer, the magnetic layer, and the protective layer were formed by Ar-gas sputtering. In this case, the Ar pressure was 2.0 millitorr. By varying the Cr content of the CoCrPt magnetic layer, 20 specimens in total having compositions ranging from $CoCr_{15}Pt_8$ to $CoCr_{23}Pt_8$ were fabricated. The Cr under-layer, the magnetic layer, and the protective layer were 50 nm, 25 nm, and 10 nm thick, respectively. The substrate temperature at the time of forming the Cr under-layer, the magnetic layer, and the protective carbon film was 300° C.

The coercivities $H_c$ of the media thus fabricated were distributed in a range of 1800–2800 oersteds. The fluctuation fields were distributed in a range of 12.0–20.5 oersteds.

As in the first embodiment of the present invention, the electromagnetic transducing properties were measured. As a result the noise values at the longitudinal bit density of 150 kFCI ranged from 17.9 to 30 μVrms. Table 2 collectively shows the measurement results.

TABLE 2

| Composition of magnetic film | Thickness of magnetic film (nm) | Fluctuation field (Oe) | Coercivity (Oe) | Noise (μVrms) |
|---|---|---|---|---|
| $CoCr_{15}Pt_8$ | 25 | 12.0 | 1800 | 30.0 |
| $CoCr_{15}Pt_8$ | 25 | 12.6 | 1890 | 24.3 |
| $CoCr_{16}Pt_8$ | 25 | 12.2 | 1820 | 29.8 |
| $CoCr_{16}Pt_8$ | 25 | 12.9 | 1850 | 26.3 |
| $CoCr_{17}Pt_8$ | 25 | 13.1 | 1920 | 23.6 |
| $CoCr_{17}Pt_8$ | 25 | 13.3 | 2010 | 23.2 |
| $CoCr_{17}Pt_8$ | 25 | 13.7 | 1860 | 22.6 |
| $CoCr_{18}Pt_8$ | 25 | 13.3 | 2011 | 23.3 |
| $CoCr_{18}Pt_8$ | 25 | 14.5 | 2306 | 22.1 |
| $CoCr_{19}Pt_8$ | 25 | 14.1 | 2215 | 22.2 |
| $CoCr_{19}Pt_8$ | 25 | 14.6 | 2526 | 21.8 |
| $CoCr_{20}Pt_8$ | 25 | 14.9 | 2756 | 21.6 |
| $CoCr_{20}Pt_8$ | 25 | 15.0 | 2654 | 19.5 |
| $CoCr_{21}Pt_8$ | 25 | 15.1 | 2345 | 18.8 |
| $CoCr_{21}Pt_8$ | 25 | 16.2 | 2645 | 18.8 |
| $CoCr_{22}Pt_8$ | 25 | 15.3 | 2689 | 19.3 |
| $CoCr_{22}Pt_8$ | 25 | 16.8 | 2608 | 19.2 |
| $CoCr_{23}Pt_8$ | 25 | 17.5 | 2720 | 18.3 |
| $CoCr_{23}Pt_8$ | 25 | 18.8 | 2800 | 19.1 |
| $CoCr_{23}Pt_8$ | 25 | 20.5 | 2750 | 17.9 |

Figure 3:
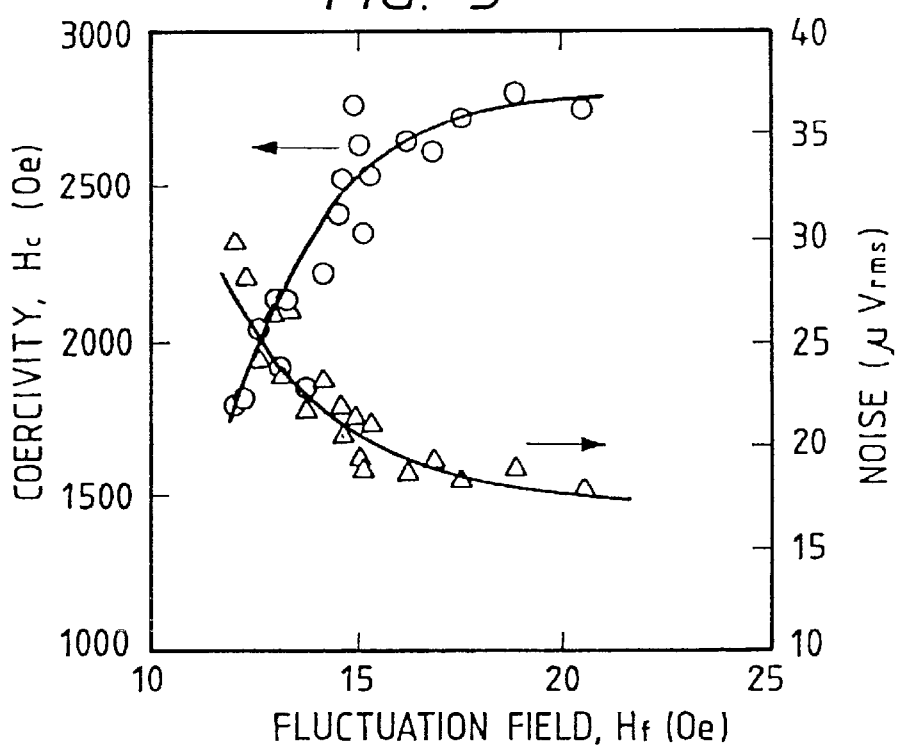
FIG. 3 is a characteristic diagram showing the relations between the fluctuation field and the coercivity and between the fluctuation field and the noise.

FIG. 3 shows the relations between the fluctuation field and the coercivity and between the fluctuation field and the noise. As is obvious from FIG. 3, the noise values of the media whose fluctuation fields have great values are conversely low as in the first embodiment of the present invention. The S/N values of media having fluctuation fields of not less than 15 oersteds are higher than those of conventional ones. The use of media having fluctuation fields of not less than 15.0 oersteds made it possible to manufacture magnetic disk units having a recording density of 1-gigabit/square inch. Moreover, the use of media having fluctuation fields of 20.5 oersteds and coercivity of 2750 oersteds also made it possible to manufacture magnetic disk units having a recording density of 1.5-gigabits/square inch. However, any one of the media illustrated in this embodiment was unsuitable for manufacturing magnetic disk units having a recording density of 2-gigabits/square inch.

Embodiment 3

A Cr under-layer was first formed on a mirror-polished glass disk, and then a CoCrPt magnetic layer together with a protective carbon film was formed thereon to prepare a magnetic disk.

The Cr under-layer, the magnetic layer, and the protective layer were formed by Ar-gas sputtering. In this case, the Ar pressure was 2.0 millitorr, and the composition of the CoCrPt magnetic layer utilized was $CoCr_{19}Pt_8$. Then 30 specimens were fabricated by varying the thickness of the Cr under-layer from 3 up to 50 nm, varying the thickness of the magnetic layers from 3 up to 30 nm, and setting the thickness of the protective layer to 10 nm. The substrate temperature at the time of forming the Cr under-layer, the magnetic layer, and the protective carbon film was 300° C.

The coercivities $H_c$ of the media thus fabricated were distributed in a range of 1200–2900 oersteds. The fluctuation fields were distributed in a range of 11.2–68.3 oersteds.

As in the first embodiment of the present invention, the electromagnetic transducing properties were measured. As a result, the noise values at the longitudinal bit density of 150 kFCI widely ranged from 8 to 31 μVrms. Table 3 collectively shows the measurement results.

TABLE 3

| Composition of magnetic film | Thickness of magnetic film (nm) | Fluctuation field (Oe) | Coercivity (Oe) | Noise (μVrms) |
|---|---|---|---|---|
| $CoCr_{19}Pt_8$ | 30 | 11.2 | 1200 | 31.0 |
| $CoCr_{19}Pt_8$ | 30 | 11.7 | 1321 | 29.6 |
| $CoCr_{19}Pt_8$ | 30 | 15.1 | 2140 | 19.6 |
| $CoCr_{19}Pt_8$ | 30 | 15.5 | 2206 | 21.9 |
| $CoCr_{19}Pt_8$ | 30 | 15.6 | 2518 | 21.9 |
| $CoCr_{19}Pt_8$ | 27 | 12.1 | 1880 | 23.1 |
| $CoCr_{19}Pt_8$ | 27 | 13.2 | 1625 | 24.0 |
| $CoCr_{19}Pt_8$ | 27 | 13.8 | 1979 | 22.8 |
| $CoCr_{19}Pt_8$ | 27 | 14.2 | 1959 | 21.5 |
| $CoCr_{19}Pt_8$ | 27 | 19.7 | 2356 | 18.2 |
| $CoCr_{19}Pt_8$ | 25 | 12.4 | 1754 | 25.8 |
| $CoCr_{19}Pt_8$ | 25 | 15.3 | 1818 | 20.7 |
| $CoCr_{19}Pt_8$ | 25 | 16.5 | 2623 | 18.6 |
| $CoCr_{19}Pt_8$ | 22 | 22.7 | 2218 | 18.8 |
| $CoCr_{19}Pt_8$ | 22 | 33.2 | 2756 | 16.7 |
| $CoCr_{19}Pt_8$ | 20 | 23.6 | 2706 | 19.2 |
| $CoCr_{19}Pt_8$ | 20 | 25.8 | 2900 | 18.3 |
| $CoCr_{19}Pt_8$ | 15 | 26.4 | 2800 | 17.8 |
| $CoCr_{19}Pt_8$ | 15 | 29.4 | 2300 | 17.6 |
| $CoCr_{19}Pt_8$ | 15 | 38.7 | 2356 | 15.6 |
| $CoCr_{19}Pt_8$ | 12 | 21.5 | 1957 | 19.3 |
| $CoCr_{19}Pt_8$ | 10 | 39.6 | 2408 | 14.5 |
| $CoCr_{19}Pt_8$ | 10 | 44.3 | 2036 | 13.3 |
| $CoCr_{19}Pt_8$ | 10 | 58.6 | 1789 | 14.2 |
| $CoCr_{19}Pt_8$ | 10 | 53.2 | 2013 | 11.3 |
| $CoCr_{19}Pt_8$ | 8 | 60.3 | 1802 | 10.3 |
| $CoCr_{19}Pt_8$ | 8 | 67.5 | 1400 | 9.5 |
| $CoCr_{19}Pt_8$ | 5 | 61.2 | 1830 | 8.9 |
| $CoCr_{19}Pt_8$ | 5 | 63.5 | 1750 | 8.3 |
| $CoCr_{19}Pt_8$ | 3 | 68.3 | 1540 | 8.0 |

Figure 4:
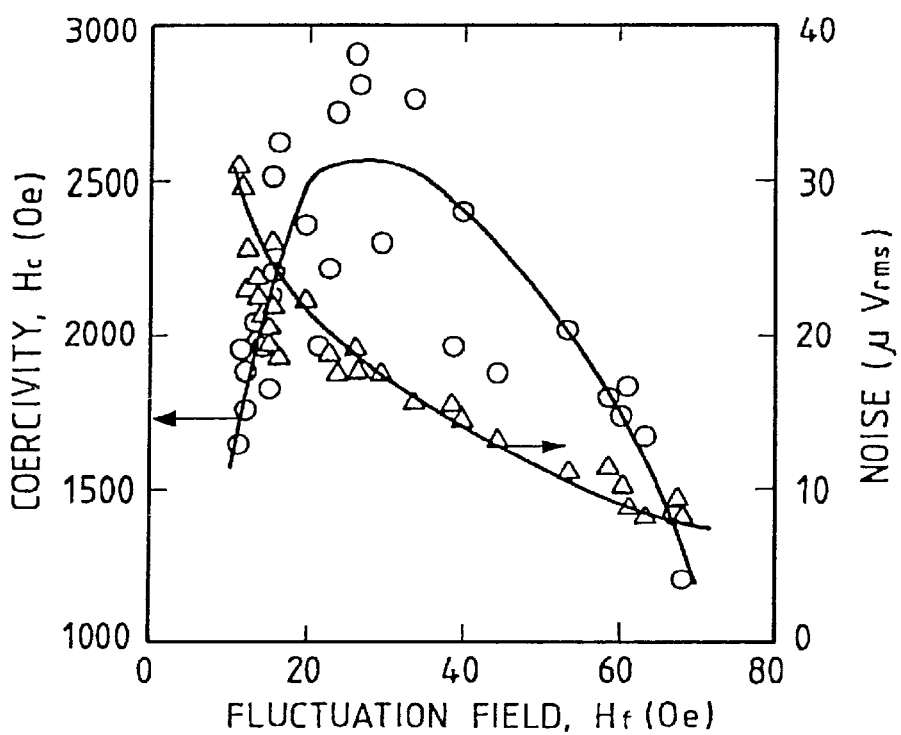
FIG. 4 is a characteristic diagram showing the relations between the fluctuation field and the coercivity and between the fluctuation field and the noise.

FIG. 4 shows the relations between the fluctuation field and the coercivity and between the fluctuation field and the noise. As is obvious from FIG. 4, the noise values of the media whose fluctuation fields have great values are conversely low as in the first and second embodiments of the present invention. The use of media whose thicknesses of the magnetic film were 10–27 nm, whose fluctuation fields were not less than 15 oersteds, and whose coercivities were not less than 2000 oersteds made it possible to manufacture magnetic disk units having a recording density of 1-gigabit/square inch. Moreover, the use of media whose thicknesses of the magnetic film were 10–25 nm thick, whose fluctuation fields were not less than 20 oersteds, and whose coercivities were not less than 2000 oersteds also made it possible to manufacture magnetic disk units having a recording density of 1.5-gigabits/square inch. Further, the use of media whose thicknesses of the magnetic film were 10–22 nm, whose fluctuation fields were not less than 30 oersteds, and whose coercivities were not less than 2000 oersteds made it possible to manufacture magnetic disk units having a recording density of 2-gigabits/square inch. In this embodiment, media whose coercivities were not less than 2000 oersteds could not be fabricated when the fluctuation fields exceeded 60 oersteds. The outputs of the media whose coercivities were less than 2000 oersteds were low, and besides, even though the noise values were low, it was impossible to manufacture magnetic disk units having a recording density of not less than 1-gigabit/square inch. If, however, a medium having a coercivity of not less than 2000 or 3000 oersteds is fabricated even though the fluctuation field exceeds 60 oersteds, a magnetic disk unit having a recording density of 2-gigabits/square inch or greater may be manufactured.

Notwithstanding this, the influence of thermal fluctuation will become critical if the fluctuation field exceeds 1/20 of the coercivity, thus making the medium practically unusable. Although noise values were low in the case of media whose magnetic films were less than 5 nm thick, sufficient outputs were not achieved, and consequently a magnetic disk unit having a recording density of not less than 1-gigabit/square inch could not be manufactured using such media. If, further, the thickness of the magnetic film exceeds 30 nm, demagnetization in recording due to the thick film was too great. As a result, no magnetic disk unit having a recording density of 1-gigabit/square inch was manufactured.

Embodiment 4

Figure 5A:
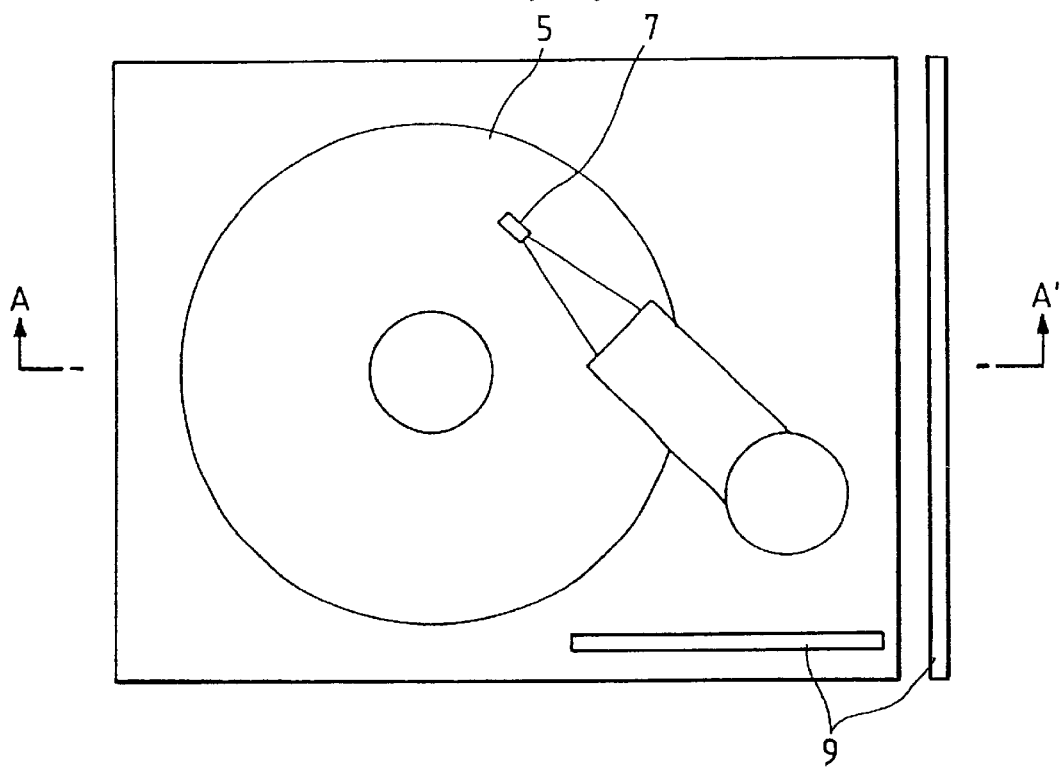
FIG. 5($a$) is a top structural view of a magnetic disk unit, and FIG. 5($b$) is a cross-section structural view of the magnetic disk unit in FIG. 5($a$) taken along the line V($b$)–V($b$)' in FIG. 5($a$).
Figure 5B:
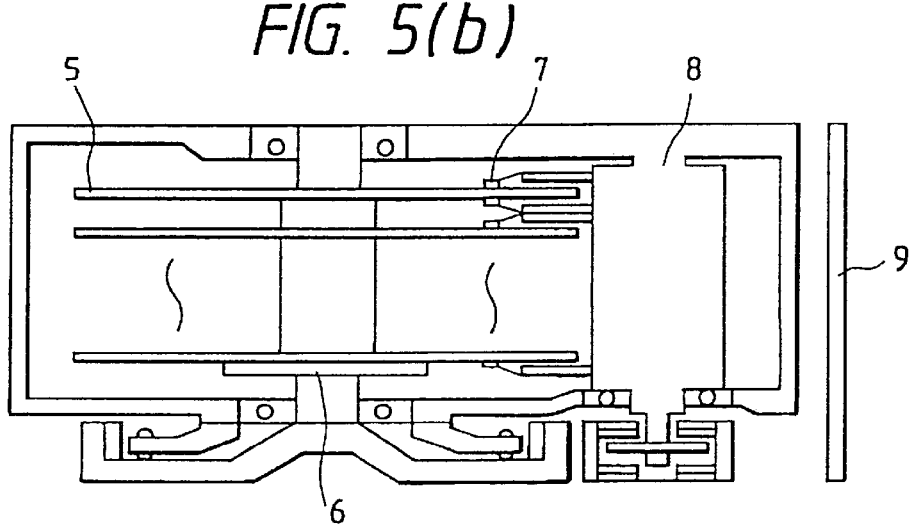

FIG. 5(a) is a top structural view of a magnetic disk unit manufactured by using media according to the present invention, and FIG. 5(b) is a cross-sectional structural view of the magnetic disk unit in FIG. 5(a) taken along the line V(b)–V(b)' in FIG. 5(a). In FIGS. 5(a) and 5(b), reference numeral 5 denotes a magnetic recording medium; 6, a magnetic recording medium drive; 7, a magnetic head; 8, a magnetic head drive; and 9, a recording and reproducing signal processor system. The use of magnetic recording media in the first to third embodiments of the present invention makes it possible to realize a recording density of not less than 1-gigabit/square inch.

As set forth above, according to the present invention, if a ferromagnetic thin film whose fluctuation field of magnetic viscosity at 25° C. at the field strength equal to the remanence coercivity or the coercivity is not less than 15 oersteds and whose coercivity is not less than 2000 oersteds is used, the S/N value of the media can be remarkably improved, thus enabling high-density recording.

What is claimed is:

1. A thin film magnetic recording medium comprising a magnetic layer made of a cobalt-based film containing Co, Cr, and at least one element selected from the group of elements consisting of Ta, Pt, Ni, Mo, V, Ti, Zr, Hf, Si, W, and O;

wherein the magnetic layer has a fluctuation field $H_f$ of not less than 30 oersteds, the fluctuation field $H_f$ being determined from the equation $H_f = S/X_{irr}$, where S is magnetic viscosity and $X_{irr}$ is irreversible susceptibility;

wherein a thickness of the magnetic layer is greater than or equal to 10 nm and is less than or equal to 22 nm; and wherein a coercivity of the magnetic layer is not less than 2000 oersteds.

2. A thin film magnetic recording medium comprising a magnetic layer made of a cobalt-based film containing Co, Cr, and at least one element selected from the group of elements consisting of Ta, Pt, Ni, Mo, V, Ti, Zr, Hf, Si, W, and O;

wherein the magnetic layer has a fluctuation field A of not less than 30 oersteds, the fluctuation field A being determined from the equation $H_c = -A \cdot \ln(t) + \text{const}$ expressing a time dependence of magnetic coercivity $H_c$ at a DC erased state against an external magnetic field, where const is a mathematical constant;

wherein a thickness of the magnetic layer is greater than or equal to 10 nm and is less than or equal to 22 nm; and wherein a coercivity of the magnetic layer is not less than 2000 oersteds.

* * * * *